United States Patent
Tibbott et al.

(10) Patent No.: US 8,807,942 B2
(45) Date of Patent: Aug. 19, 2014

(54) TURBINE DISC COOLING ARRANGEMENT

(75) Inventors: Ian Tibbott, Lichfield (GB); Dougal R. Jackson, Derby (GB); Rory J. Clarkson, Derby (GB)

(73) Assignee: Rolls-Royce PLC, London (GB)

( * ) Notice: Subject to any disclaimer, the term of this patent is extended or adjusted under 35 U.S.C. 154(b) by 406 days.

(21) Appl. No.: 13/232,584

(22) Filed: Sep. 14, 2011

(65) Prior Publication Data
US 2012/0082568 A1 Apr. 5, 2012

(30) Foreign Application Priority Data
Oct. 4, 2010 (GB) .................................. 1016597.5

(51) Int. Cl.
F01D 5/18 (2006.01)
F01D 5/30 (2006.01)
F01D 5/08 (2006.01)

(52) U.S. Cl.
CPC .............. F01D 5/081 (2013.01); F01D 5/3007 (2013.01); F05D 2260/201 (2013.01); F01D 5/085 (2013.01); F01D 5/087 (2013.01); F01D 5/088 (2013.01); F05D 2240/81 (2013.01); F01D 5/3015 (2013.01); F05D 2260/202 (2013.01); F01D 5/082 (2013.01)
USPC ..... 416/96 R; 416/95; 416/193 A; 416/220 R

(58) Field of Classification Search
CPC ........... F01D 5/08; F01D 5/081; F01D 5/082; F01D 5/085; F01D 5/087; F01D 5/088; F01D 5/18; F01D 5/186; F01D 5/187; F05B 2240/801; F05D 2240/81
USPC ............... 415/115; 416/95, 96 R, 96 A, 97 R, 416/193 A, 220 R, 500
See application file for complete search history.

(56) References Cited

U.S. PATENT DOCUMENTS 4,505,640 A 3/1985 Hsing et al.
4,505,642 A * 3/1985 Hill .......................... 416/193 A
(Continued)

FOREIGN PATENT DOCUMENTS

EP 0 502 660 A1 9/1992
EP 1 028 228 A1 8/2000
(Continued)

OTHER PUBLICATIONS

Jan. 17, 2011 United Kingdom Combined Search and Examination Report issued in related Application No. GB1016597.5.

(Continued)

Primary Examiner — Christopher Verdier
(74) Attorney, Agent, or Firm — Oliff PLC

(57) ABSTRACT

A cooling arrangement is provided for a turbine disc of a gas turbine engine. The turbine disc has a plurality of circumferentially spaced disc posts forming fixtures therebetween for a row of turbine blades. Each turbine blade has an attachment formation which engages at a respective fixture, a platform radially outwardly of the attachment formation such that the adjacent platforms of the row form an inner endwall for the working gas annulus of the engine, and an aerofoil which extends radially outwardly from the platform. A respective cavity is formed between an exposed radially outer surface of each disc post and the inner endwall. The cooling arrangement has at each disc post, a cooling plate located in the respective cavity and spaced radially outwardly from the exposed outer surface of the disc post to form a cooling channel between the cooling plate and the exposed outer surface.

7 Claims, 9 Drawing Sheets

(56) References Cited

U.S. PATENT DOCUMENTS

| | | | |
|---|---|---|---|
| 5,281,097 A | 1/1994 | Wilson et al. | |
| 5,388,962 A | 2/1995 | Wygle et al. | |
| 5,957,660 A | 9/1999 | Evans et al. | |
| 6,017,189 A | 1/2000 | Judet et al. | |
| 6,457,935 B1 | 10/2002 | Antunes et al. | |
| 7,214,034 B2 * | 5/2007 | Giot et al. | 416/193 A |
| 2004/0115054 A1 | 6/2004 | Balland et al. | |
| 2005/0201857 A1 * | 9/2005 | Ferra et al. | 415/115 |
| 2005/0232751 A1 * | 10/2005 | Townes et al. | 415/115 |
| 2007/0041836 A1 | 2/2007 | Tschuor et al. | |

FOREIGN PATENT DOCUMENTS

| | | |
|---|---|---|
| EP | 1 251 243 A1 | 10/2002 |
| GB | 2 411 697 A | 9/2005 |
| GB | 2 435 909 A | 9/2007 |
| WO | WO 2005/095761 A1 | 10/2005 |

OTHER PUBLICATIONS

European Search Report for Application No. 11 18 1253 mailed Nov. 29, 2013.

* cited by examiner

Prior Art

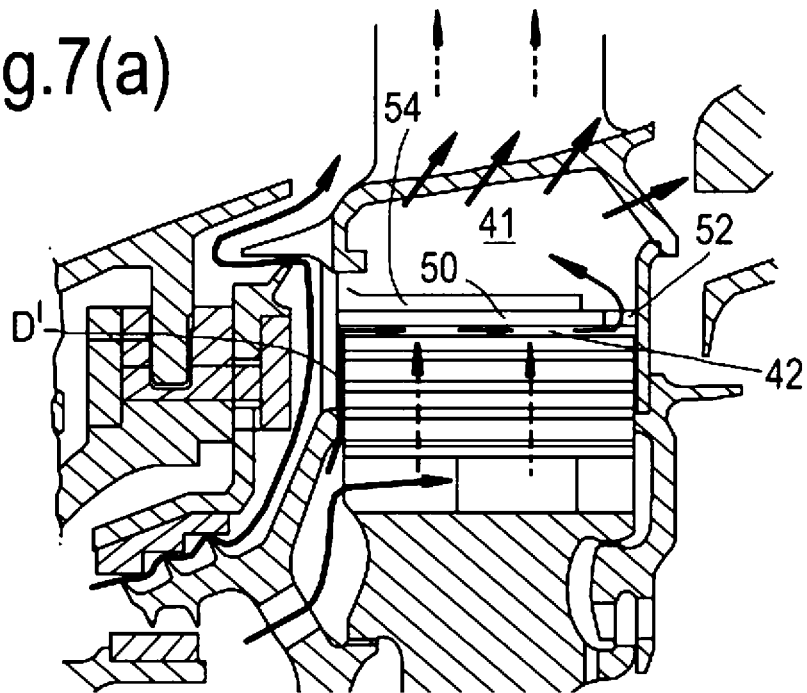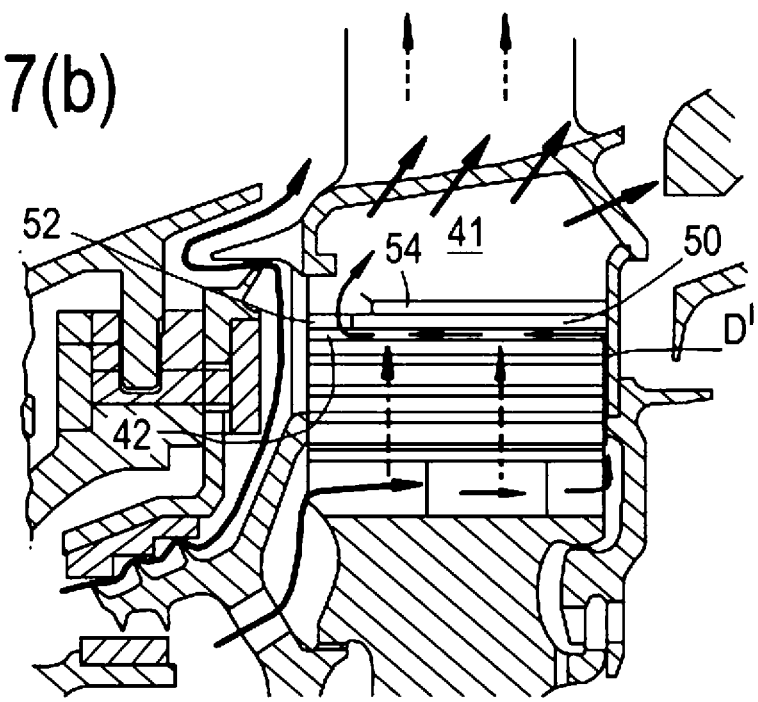

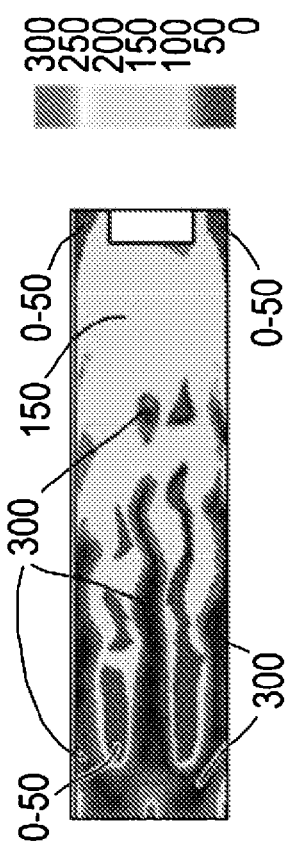
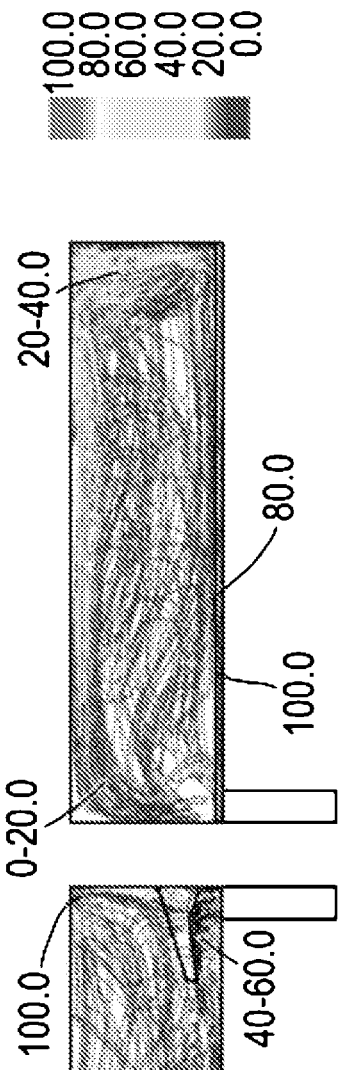
Fig.9(a)
Fig.9(b)

TURBINE DISC COOLING ARRANGEMENT

The present invention relates to a cooling arrangement for a turbine disc of a gas turbine engine With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate-pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However as turbine entry temperatures increase, the life of an un-cooled turbine falls, necessitating the development of better materials and the introduction of internal air cooling.

In modern engines, the high-pressure turbine gas temperatures are hotter than the melting point of the material of the blades and vanes, necessitating internal air cooling of these airfoil components. During its passage through the engine, the mean temperature of the gas stream decreases as power is extracted. Therefore, the need to cool the static and rotary parts of the engine structure decreases as the gas moves from the high-pressure stage(s), through the intermediate-pressure and low-pressure stages, and towards the exit nozzle.

FIG. 2 shows an isometric view of a typical single stage cooled high pressure (HP) turbine. Cooling air flows are indicated by arrows. The working gas leaving the combustor encounters a row of nozzle guide vanes 31 (NGVs), and then a row of HP turbine blades 32 mounted on a turbine disc 33 by fir tree attachment formations 34 at the bases of the turbine blades.

Internal convection and external films are the prime methods of cooling the gas path components—airfoils, platforms, shrouds and shroud segments etc. The NGVs 31 consume the greatest amount of cooling air on high temperature engines. The HP blades 32 typically use about half of the NGV flow. The intermediate-pressure and low-pressure stages downstream of the HP turbine use progressively less cooling air.

The HP turbine airfoils are cooled by using high pressure air from the compressor that has by-passed the combustor and is therefore relatively cool compared to the gas temperature. Typical cooling air temperatures are between 800 and 1000 K, while gas temperatures can be in excess of 2100 K.

The cooling air from the compressor that is used to cool the hot turbine components is not used fully to extract work from the turbine. Therefore, as extracting coolant flow has an adverse effect on the engine operating efficiency, it is important to use the cooling air effectively.

FIG. 3 shows in more detail a schematic longitudinal cross-section through the radially outer part of a turbine disc 33 and the radially inner part of an HP turbine blade 32 attached to a disc. The disc has a plurality of circumferentially spaced disc posts 35 which form fixtures therebetween for the fir tree attachment formations 34. Outward of its tree attachment formation, each blade has a platform 36 which forms with the other platforms of the row of blades a radially inner endwall of the working gas annulus of the engine. Each blade then provides an aerofoil 37 which extends radially across the working gas annulus from the platform.

A front cover-plate 38 covers the outer front face of the disc 33 and a rear cover-plate 39 covers the outer rear face of the disc. The cover-plates protect the outer front and rear faces of the disc and secure the blades on the disc. The front plate in particular also assists in directing a flow A of cooling air bled from the high pressure compressor to the disc and another flow B to the roots of the blades 32 (and thence into a cooling flow C for the interior of the blades). A row of aft lock-plates 40 also help to prevent axial movement of the blades relative to the disc.

The rotating structures, such as the disc 33, cover-plates 38, 39 and lock-plates 40 etc. are particularly sensitive to small changes in metal temperature, and rely heavily on copious amounts of cooling air to maintain their structural integrity. The prime cause of premature failure or more correctly part replacement for these critical components is low cycle mechanical and thermal fatigue. In recent years the outer peripheral temperature of the disc, and particularly the disc posts 35, has become a life-limiting location of the HP turbine.

Thus one proposal, illustrated in FIG. 3, is to bleed a flow D of high pressure compressor cooling air from flow A into the cavity 41 formed between each pair of adjacent blade platforms 36 and the exposed radially outer surface 42 of the corresponding disc post 35. This cooling air bleed swirls around in the cavity to provide limited cooling around the disc post before leaking into the gas path via the gap between the blade platforms or via a leakage pathway 43 between the blade platforms and the NGV platforms.

Problems with this arrangement, however, are the relatively low heat transfer coefficients on the exposed outer surface 42 of the disc post 35, the lack of control in terms of flow direction in the cavity 41, and the mixing of the fresh and spent coolant within the cavity, which elevates the coolant temperature. In addition, heat radiates from the hot platforms 36 onto the exposed outer surface 42.

FIG. 4 thus shows an alternative cooling arrangement, which provides an improvement over the arrangement of FIG. 3. In the alternative arrangement, the disc has fore 44 and aft 40 lock-plates. A cooling flow D' for the exposed outer surface 42 is diverted from the flow B to the roots of the blades. The flow D' proceeds radially outwards through a series of grooves in the front and rear faces of the disc, or alternatively through groves in the front and rear lock-plates and directed back down onto the disc post by deflector members 45 incorporated into the lock-plates' inward-facing surfaces. The cooling flow thus impinges at an angle of approximately 30 degrees onto the exposed outer surface 42 of the disc post from opposite directions, with the two streams of air meeting at the centre of the post and redirecting outwards towards the blade platform. Although the exposed outer surface 42 is cooled more effectively, there is a lack of control over the heat transfer coefficient distribution along the axial length of the disc post, and still some contamination of fresh coolant with spent coolant. Also, heat can radiate from the hot platforms 36 onto the exposed outer surface 42. Therefore, relatively larger quantities of coolant are still required, causing mixing losses that detrimentally affect turbine performance. Further, there is a cost and weight penalty associated with use of the deflector members. In particular, the deflector members add weight to the lock-plates and their supports in three ways: (i) the additional weight of the deflector members themselves, (ii) the additional weight due to the thickening of the lock-plates to support the deflector members, and (iii) additional material and hence weight in the blade to accommodate the thickened lock-plates.

U.S. Pat. No. 7,207,776 (hereby incorporated by reference) proposes a cooling arrangement similar to the one shown in FIG. 4, as well as other possible cooling arrangements.

Presently, disc life can be limited by the temperature of the disc post at its exposed outer surface even with the benefits of the cooling arrangements shown in FIGS. 3 and 4. However, higher overall engine pressure ratios affect the disc life because they lead to an increase in the compressor delivery flow temperature, and hence the temperature of the coolant flow bled from the compressed air. Similarly, higher gas-path temperatures also detrimentally affect the temperature of the disc post, largely due to its location where it is susceptible to heat radiated to the exposed outer surface.

Thus there is a need for improved cooling arrangements for the disc periphery, and in particular for the exposed outer surface of the disc post.

Accordingly, a first aspect of the present invention provides a cooling arrangement for a turbine disc of a gas turbine engine, the turbine disc having a plurality of circumferentially spaced disc posts forming fixtures therebetween for a row of turbine blades, each turbine blade having an attachment formation which engages at a respective fixture, a platform radially outwardly of the attachment formation such that the adjacent platforms of the row form an inner endwall for the working gas annulus of the engine, and an aerofoil which extends radially outwardly from the platform, wherein a respective cavity is formed between an exposed radially outer surface of each disc post and the inner endwall;

wherein the cooling arrangement comprises:

at each disc post, a cooling plate removably locatable in the respective cavity and spaced radially outwardly from the exposed outer surface of the disc post to form a cooling channel between the cooling plate and the exposed outer surface, each cooling plate covering substantially the entire exposed outer surface, and a coolant supply system for supplying coolant to the cooling channels.

The cooling channel allows the flow coolant therein to remain attached to the exposed outer surface of the disc post, and can help to prevent mixing between fresh and spent coolant. In this way, heat transfer can be enhanced and relatively high heat transfer coefficients obtained across most, if not all, of the exposed surface. Further, the cooling plate can protect the exposed surface from heat radiated across the cavity from the endwall. Although the cooling plate is then itself subject to this radiated heat, being removably locatable, the cooling plate can be removed and replaced when necessary, e.g. at overhaul, thereby helping to increase the life of the more costly and critical disc.

The cooling arrangement may have any one or, to the extent that they are compatible, any combination of the following optional features.

Typically, each turbine blade has a fir tree attachment formation, the fixtures formed between the disc posts providing correspondingly-shaped recesses which co-operatively engage with the formations.

Preferably, each cooling plate has one or more exit holes formed therein for transferring spent coolant from the cooling channel to the cavity. In this way, the spent coolant can be prevented from mixing with fresh coolant entering the channel. The spent coolant can exit into the working gas annulus from the cavity by leakage between adjacent platforms or other pathways.

Preferably, the or each exit hole is positioned axially centrally in the cooling plate, and the coolant supply system supplies coolant to both the forward and the rearward ends of the cooling channel. This configuration allows both the forward and rearward edges of the exposed outer surface of the disc post to experience enhanced cooling, these edges generally experiencing a high heat load. However, alternatively, the or each exit hole can be positioned toward one of the forward and rearward edges of the exposed outer surface and the coolant supply system can supply coolant to the opposing end cooling channel. This allows a simpler and cheaper coolant supply system to be provided.

Conveniently, the coolant supply system may divert a portion of a flow of coolant for internally cooling the aerofoils towards the cooling channels, the system comprising a plurality of passages extending across the front and/or the rear faces of the disc post from a base of the fixtures for the turbine blades to respectively the forward and/or rearward ends of the cooling channels.

At each disc post, support formations may be formed in the flanks of the neighbouring turbine blades, the support formations supporting the cooling plate to maintain the radial spacing between the cooling plate and the exposed outer surface. For example, each support formation can be an additional tooth of a fir tree attachment formation. The formations can maintain the spacing of the cooling plate to the exposed outer surface against centrifugal forces acting on the plate. Alternatively, or additionally, lock-plates can be provided at the fore and aft faces of the disc posts to prevent axial movement of the blades relative to the disc, and, at each disc post, support formations can be formed in the respective fore and aft lock-plates, the support formations likewise supporting the cooling plate to maintain the radial spacing between the cooling plate and the exposed outer surface.

A separating member may be positioned in the cooling channel between the cooling plate and the exposed outer surface, the separating member containing a plurality of holes and dividing the cooling channel into a radially outer channel and a radially inner channel. The coolant supply system can then supply the coolant to the outer channel, whereupon the supplied coolant enters the inner channel via the holes as a series of jets which impinge on the exposed outer surface. By forming such impingement jets, enhanced cooling of the exposed outer surface can be obtained.

A second aspect of the present invention provides a cooling plate for the cooling arrangement of the first aspect.

A third aspect of the present invention provides the combination of a cooling plate of the first aspect and the optional separating member of that aspect.

A fourth aspect of the present invention provides a turbine blade for the cooling arrangement of the first aspect when the optional support formations are formed in the flanks of the neighbouring turbine blades, the support formations supporting the cooling plate to maintain the radial spacing between the cooling plate and the exposed outer surface.

A fifth aspect of the present invention provides a stage of a gas turbine engine comprising a turbine disc, a row of turbine blades attached to the turbine disc, and a cooling arrangement for the turbine disc according to the first aspect.

A sixth aspect of the present invention provides a gas turbine engine having the stage of the fifth aspect.

Embodiments of the invention will now be described by way of example with reference to the accompanying drawings in which.

Figure 4:
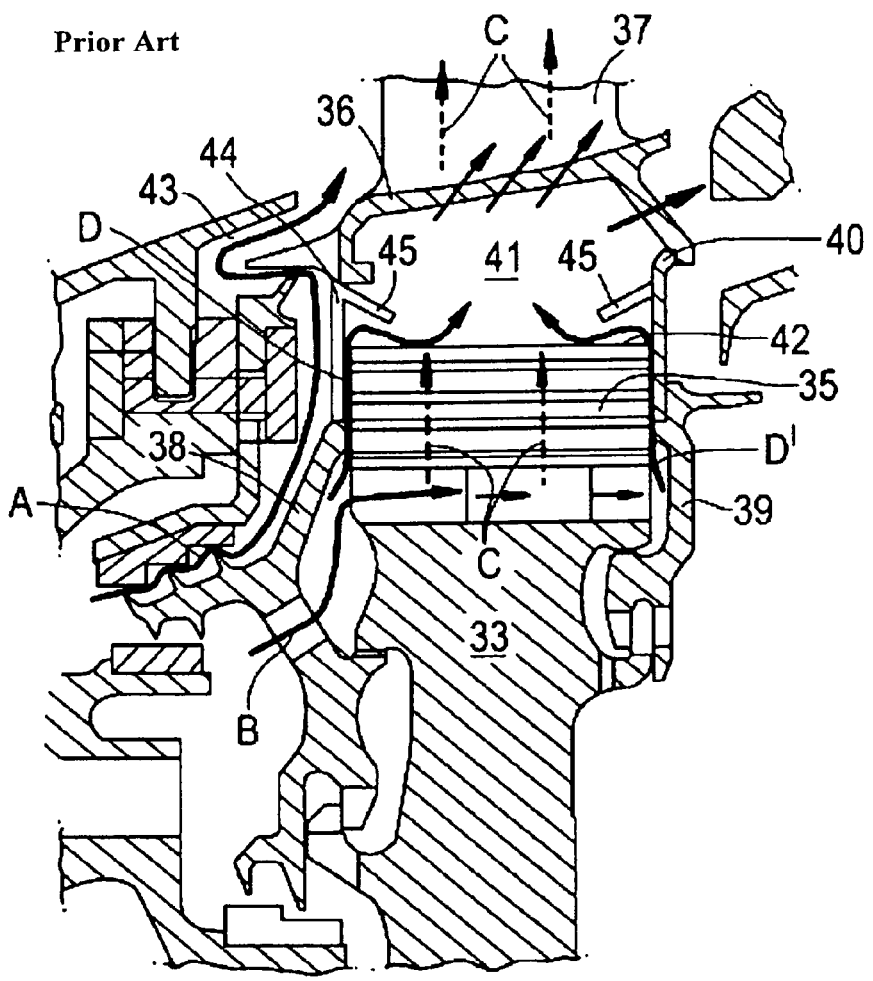
FIG. 4 shows an alternative cooling arrangement.
Figure 5A:
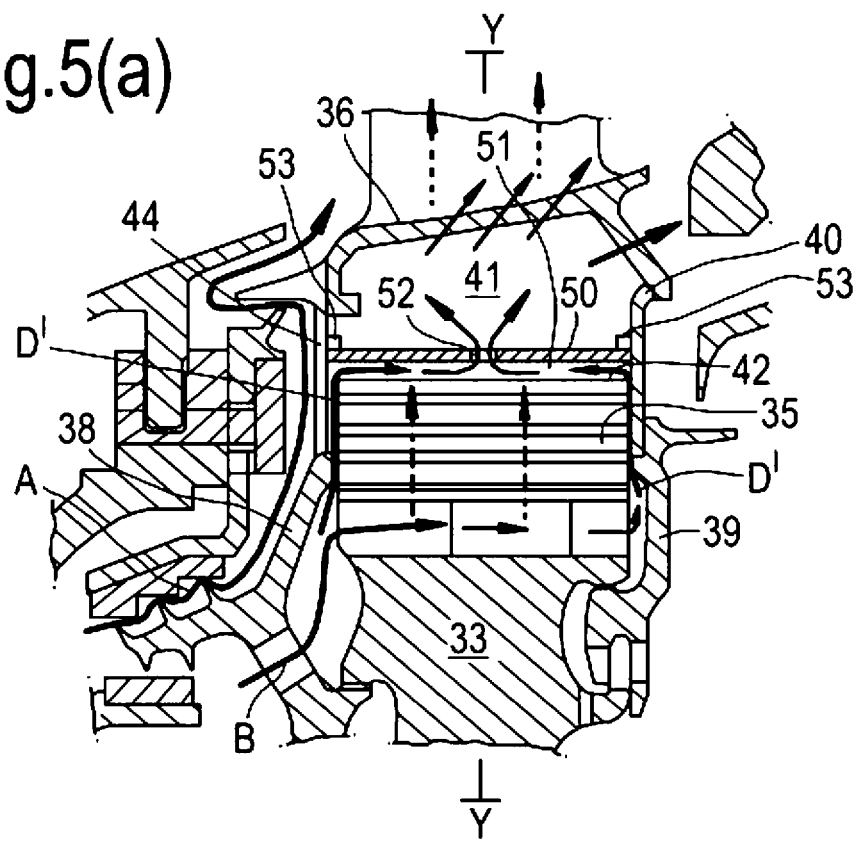
Figure 6A:
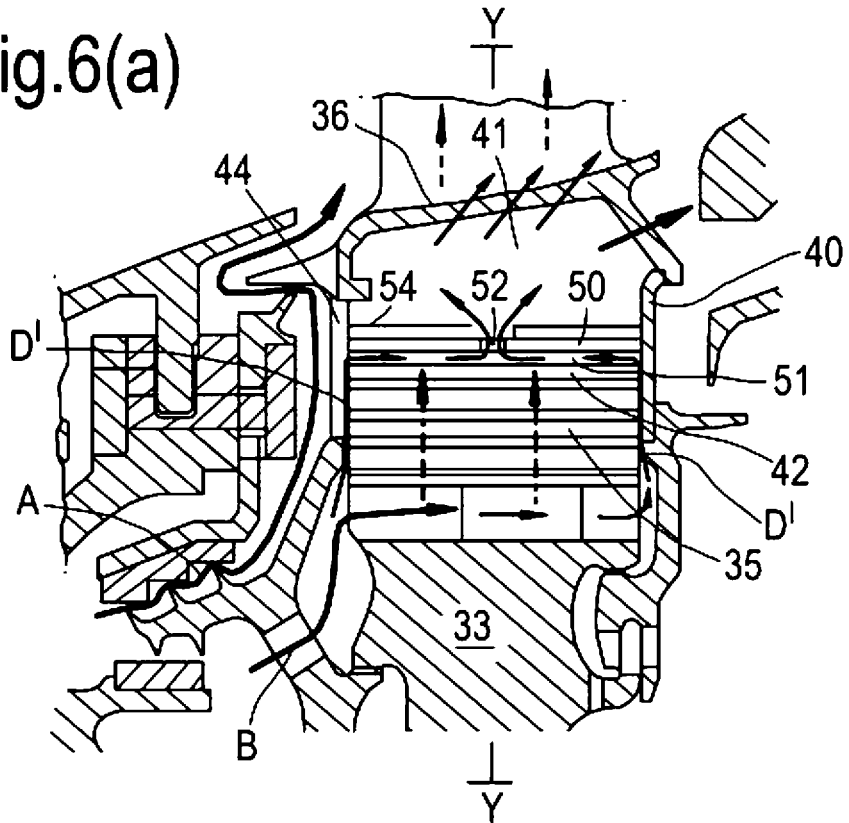
Figure 8A:
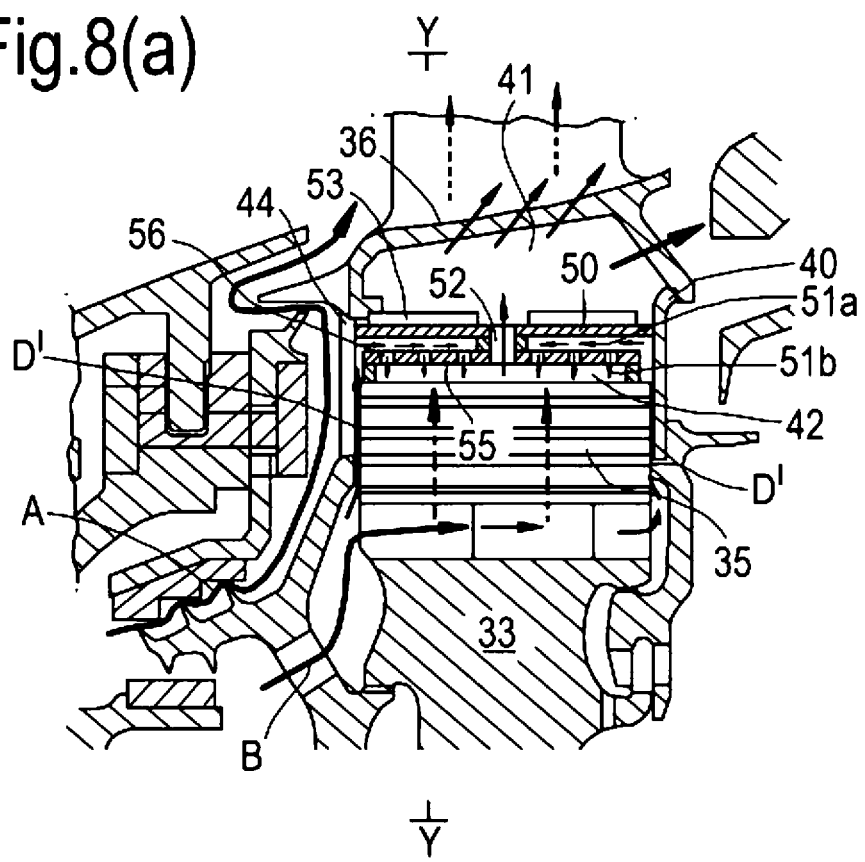

FIGS. 5(a) and (b) show a cooling arrangement according to a first embodiment of the present invention;

FIGS. 6(a) and (b) show a cooling arrangement according to a second embodiment of the present invention;

FIG. 7(a) shows cooling arrangements according to a third embodiment of the present invention, and FIG. 7(b) shows cooling arrangements according to a fourth embodiment of the present invention;

FIGS. 8(a) and (b) shows a cooling arrangement according to a fifth embodiment of the present invention; and FIG. 9(a) shows at left the results of fluent CFD (computational fluid dynamics) analyses performed on a cooling arrangement corresponding to a simplified form of the cooling arrangement shown in FIG. 4, and at right a cooling arrangement corresponding to a simplified form of the cooling arrangement of the fourth embodiment shown in FIG. 7(a), and FIG. 9(b) shows at left the corresponding predicted shear stress distribution on the exposed outer surface for the cooling arrangement corresponding to the simplified form of the cooling arrangement shown in FIG. 4, and at right the corresponding predicted shear stress distribution on the exposed outer surface for the cooling arrangement corresponding to the simplified form of the cooling arrangement of the fourth embodiment shown in FIG. 7(a).

The present invention aims at improving the effectiveness of cooling arrangements for the disc post feature of particularly an HP turbine disc by: (i) elevating the heat transfer coefficients on the exposed outer surfaces of the disc posts and providing more control over the heat transfer coefficient distribution, (ii) helping to prevent fresh coolant from mixing with spent heated coolant, and (iii) reducing radiative heating of the disc posts by the high temperature of the underside of the blade platforms.

Figure 1:
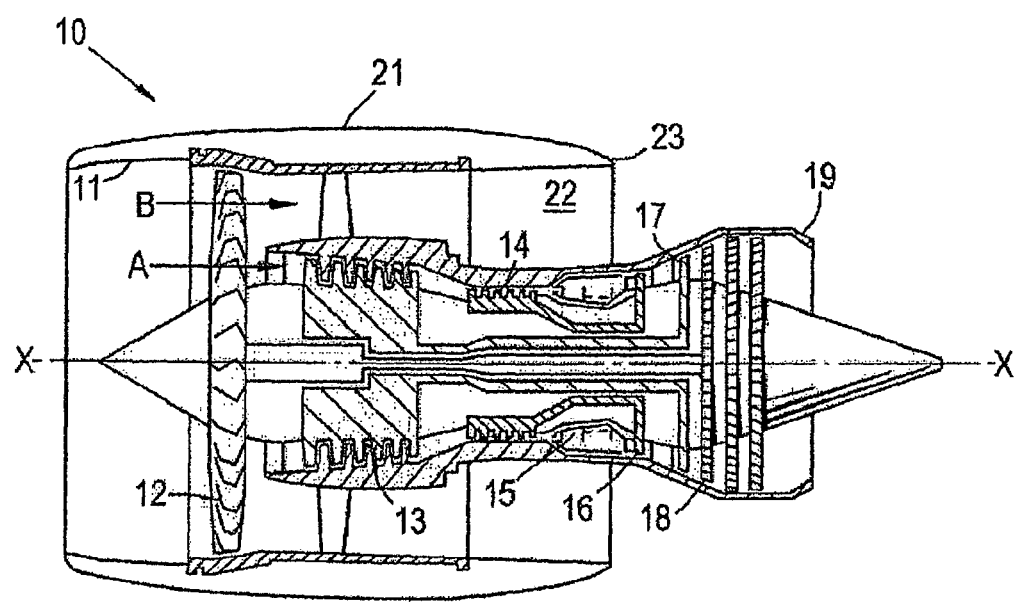
FIG. 1 shows a schematic longitudinal cross-section through a ducted fan gas turbine engine.
Figure 2:
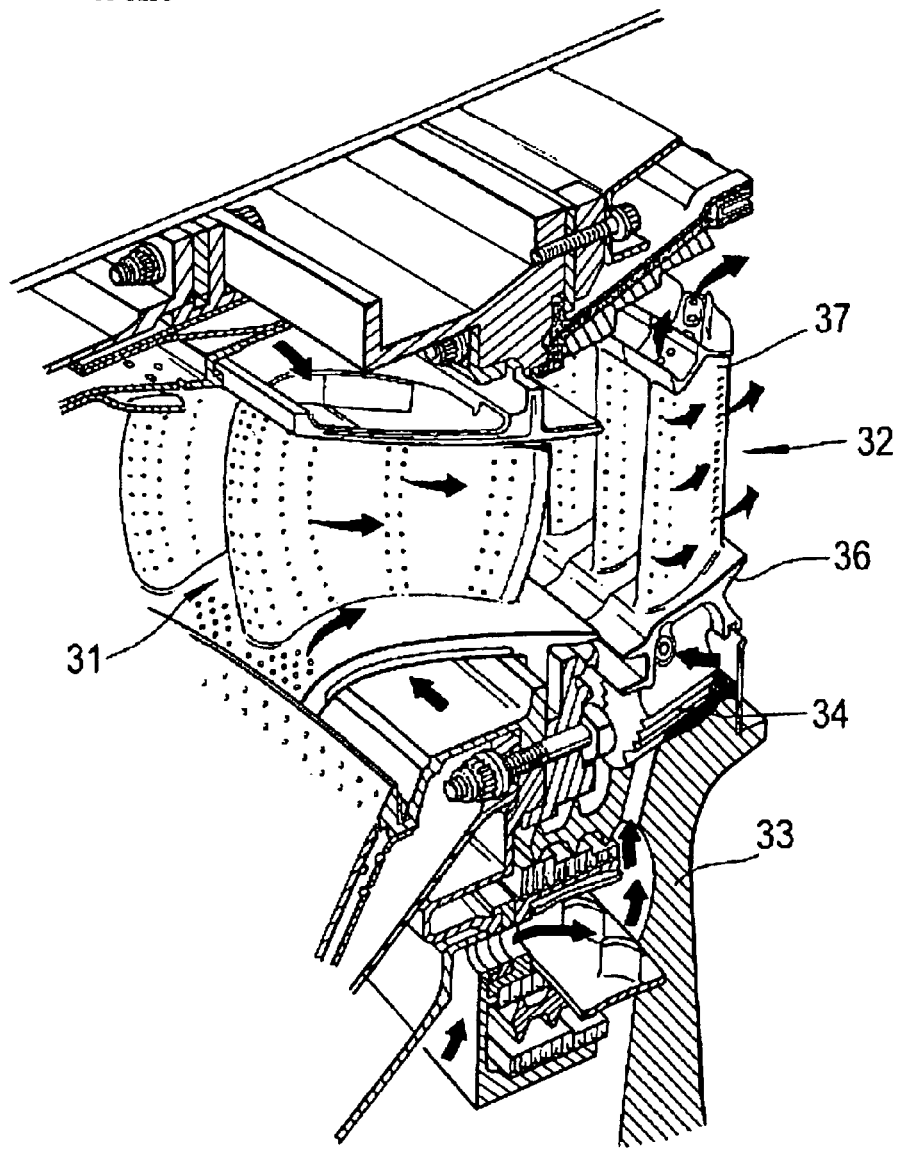
FIG. 2 shows an isometric view of a typical single stage cooled turbine.
Figure 3:
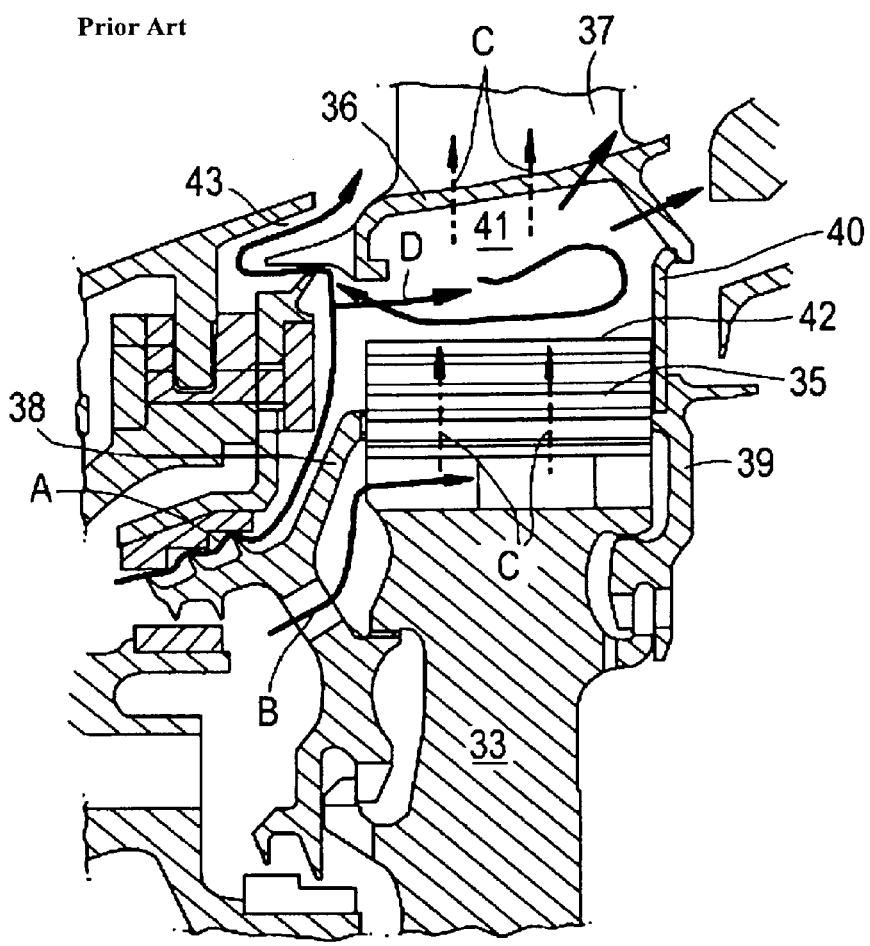
FIG. 3 shows a cooling arrangement for a turbine disc on a schematic cross-section through the radially outer part of the disc and the radially inner part of a high-pressure turbine blade attached to the disc.
Figure 5B:
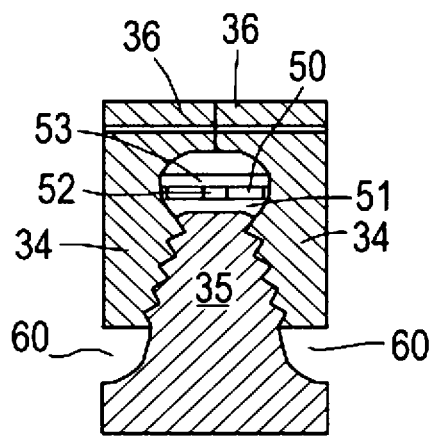

FIG. 5(a) shows a schematic longitudinal cross-section through the radially outer part of a turbine disc 33 and the radially inner part of an HP turbine blade 32 attached to a disc, and illustrates a cooling arrangement according to a first embodiment of the present invention. Similar features have the same references numbers in FIG. 5(a) as they have in FIGS. 3 and 4. FIG. 5(b) shows a schematic transverse section along plane Y-Y of FIG. 5(a).

A flow B of pre-swirled air is fed through a series of holes in the front cover-plate 38, up the front face of the disc 33 and into the bucket grooves 60 that feed the entrances to the internal cooling system of the turbine blades. A portion D' of this air is diverted off and passes radially outwards through a series of grooves machined into the front and rear faces of the disc posts 35 adjacent to the firtree attachment formations 34. Alternatively the grooves can be machined into thickened front 44 and rear 40 lock-plates instead of the disc posts. At each disc post, these front and rear streams of fresh coolant then turn at right angles towards one another through a radially narrow channel 51 formed between the exposed outer surface 42 of the disc post and a removably replaceable plate 50 that extends parallel to and covers substantially the entirety of the exposed outer surface. The plate is maintained in position against centrifugal forces by support projections 53 formed on the inner surfaces on the front and rear lock-plates, although the plate can be free to move in the gap between the outer surface 42 and the support projections 53 when the engine is stationary.

The coolant flow D' over the exposed outer surface 42 is guided towards the centre of the disc post 35, where it exits the channel 51 through a hole or series of holes 52 in the plate 50 into the main part of the cavity 41 beneath the blade platforms 36. This flow is then re-used to cool the under platform region before being ejected back into the gas-path through slots in the dampers of the platforms or through the gaps between the platforms.

Preferably, the plate 50 has a relatively close dimensional fit to the surrounding surfaces of the firtree attachment formations 34 and the lock-plates 40, 44 to prevent excessive leakage around the plate.

The close proximity of the plate 50 to the exposed outer surface 42 of the disc post 35 helps to ensure a high velocity and a high Reynolds number coolant flow, which in turn can produce high heat transfer coefficients on the outer surface.

The guidance to the coolant flow D' provided by the plate 50 also helps to ensure that fresh coolant entering the channel 51 is not diluted with spent coolant in the main part of the cavity 51 outboard of the plate.

The plate 50 provides a thermal barrier protecting the exposed outer surface 42 from the heat radiating from the lower surfaces of the blade platforms 36. Further, the plate can be readily replaced at overhaul if it is damaged by excessive exposure to high temperatures.

Although in FIGS. 5(a) and (b) the plate 50 is shown extending parallel to the outer surface 42, an option is to vary the spacing between the plate and the surface, so that the Reynolds number varies across the surface. In this way, for example, enhanced heat transfer coefficients can be obtained at positions on the surface distant from where the coolant enters the channel to compensate for increases in coolant temperature, or at positions which have a high heat burden.

Another option is to introduce flow interrupting features such as trip strips, pin, fins, pedestals which project from the lower surface of the plate 50 in order to promote turbulence and hence mixing of coolant in the channel 51. In particular, trip strips can help to limit boundary layer thickening on the lower surface of the plate by causing boundary layer separation and reattachment. This may be beneficial if the plate is exposed to high temperatures by radiation from the underside of the platforms 36.

Figure 6B:
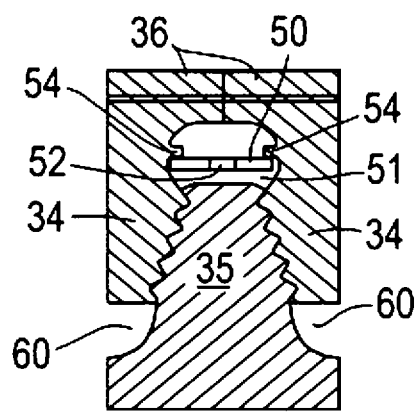

FIG. 6(a) shows a schematic longitudinal cross-section through the radially outer part of a turbine disc 33 and the radially inner part of an HP turbine blade 32 attached to a disc, and illustrates a cooling arrangement according to a second embodiment of the present invention. FIG. 6(b) shows a schematic transverse section along plane Y-Y of FIG. 6(a).

The second embodiment is identical to the first embodiment except that the plate 50 is maintained in position against centrifugal forces by axially-extending support projections 54 formed on the flanks of the neighbouring fir tree attachment formations 34. Each of these projections is effectively an additional tooth on the fir tree, and is thus relatively straightforward to manufacture at little additional cost during the grinding operation that is typically used to produce the fir tree serrations. Each projection can be axially continuous or composed of axially spaced portions (in FIG. 6(a), each projection is in two parts with a central interruption), although a continuous projection may be a more cost-effective arrangement.

FIGS. 7(a) and (b) show schematic longitudinal cross-sections illustrating respectively third and fourth embodiments of the present invention. These embodiments are identical to the second embodiment except that in the third embodiment the machined grooves in the disc post or lock plate form only a front coolant flow D' and in the fourth embodiment only a rear coolant flow D'. Further, in the third embodiment of FIG. 7(a), the hole or holes 52 in the plate 50 to the main part of the cavity 41 are at the rear of the plate, and in the fourth embodiment of FIG. 7(b), the hole or holes 52 are at the front of the plate. This modification ensures that the coolant travels the entire axial extent of the exposed outer surface 42. In FIGS. 7(a) and (b) the support projections 54 are shown truncated in the vicinity of the hole or holes 52, although it is more likely that the projections would run the entire axial length of the disc post.

The arrangements of the third and fourth embodiments shown in FIGS. 7(a) and (b) would be less expensive to manufacture than the arrangement of the second embodiment shown in FIGS. 6(a) and (b), primarily because the coolant supply system only needs to bring the coolant flow D' up one side of the disc post. However, the second embodiment better addresses the heat load distribution on the disc post.

Figure 8B:
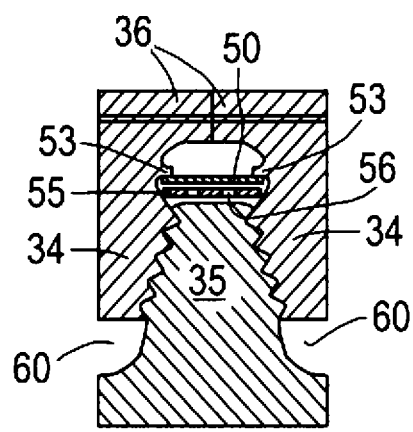

FIG. 8(a) shows a schematic longitudinal cross-section through the radially outer part of a turbine disc 33 and the radially inner part of an HP turbine blade 32 attached to a disc, and illustrates a cooling arrangement according to a fifth embodiment of the present invention. FIG. 8(b) shows a schematic transverse section along plane Y-Y of FIG. 8(a).

The cooling arrangement of the fifth embodiment is similar to that of the first embodiment except that a separating plate 55 between the plate 50 and the outer surface 42 forms an outer 51a and an inner 51b channel. The separating plate contains a pattern of through-holes 56. The cooling flow D' is supplied as before up the front and rear faces of the disc post 35, and is then bled respectively rearward and forward into the ends of the outer channel 51a. This channel acts as a plenum chamber for impingement jets that are formed by the coolant as it passes through the through-holes 56 on its way from the outer to the inner channel. The jets are directed radially inwards onto the outer surface 42 to enhance the cooling of that surface. The flow that exhausts from the impingement jets then travels along the inner channel towards the centre of the disc post and exits into the main part of the cavity 41 through the one or more central holes 52.

Providing that the pressure ratio across the impingement jets is not too low, the convective cooling provided by impingement jets should be superior to that produced by the simpler arrangements of the previous embodiments.

As in the previous embodiments, the impingement arrangement can be supplied by only a front or rear coolant flow, or both as shown in FIG. 8(a).

The heat transfer distribution across the exposed outer surface 42 can be controlled by varying the diameters, shapes and/or the distribution of the through-holes 56. However, cross flow in the inner channel 51b will tend to produce a distribution that provides greater rates of heat transfer at locations distant from the hole or holes 52. Thus, in the example shown in FIG. 8(a), heat transfer will tend to peak at the front and rear edges of the disc post.

A drawback associated with arrangement of the fifth embodiment is the additional weight of the separating plate 55 and a higher cost of manufacture.

FIG. 9(a) shows at left the results of fluent CFD (computational fluid dynamics) analyses performed on a cooling arrangement corresponding to a simplified form of the cooling arrangement shown in FIG. 4, and at right a cooling arrangement corresponding to a simplified form of the cooling arrangement of the fourth embodiment shown in FIG. 7(a). In each case the modelled area corresponds to a longitudinal cross-section through the cavity formed between each pair of adjacent blade platforms and the exposed outer surface 42 of the corresponding disc post. The coolant entrant flows are indicated by arrows, and the positions of respectively the deflector members 45 and plate 50 are indicated. The right hand result demonstrates an elimination of mixing between fresh and spent coolant. FIG. 9(b) shows at left the corresponding predicted shear stress distribution on the exposed outer surface for the cooling arrangement corresponding to the simplified form of the cooling arrangement shown in FIG. 4, and at right the corresponding predicted shear stress distribution on the exposed outer surface for the cooling arrangement corresponding to the simplified form of the cooling arrangement of the fourth embodiment shown in FIG. 7(a). As heat transfer coefficients generally vary in proportion with the shear stress, it is evident from the right hand result that significantly higher levels of heat transfer can be generated by adopting a cooling arrangement according to the present invention.

Thus the present invention can provide the following advantages:

Significant improvement in disc life due to reduced local disc post metal temperature.

High levels of convection cooling resulting from higher local Reynolds number flow and high heat transfer coefficients on the outer surface of the disc post.

Consistently high heat transfer coefficients over the complete axial length of the disc post.

Little or no interaction between fresh and spent coolant.

The effect of rotation on the cooling flow sandwiched between the cooling plate and the disc post can be small or negligible due to the proximity of the plate and the outer surface of the post, and the high Reynolds number of the flow in the channel.

The cooling plate can act as a thermal insulation barrier preventing the relatively hot under platform surface from radiating heat to the disc post.

The cooling plate can be replaced if it is damaged by over-exposure to high temperatures.

The manufacturing cost of the cooling plate can be less than the cost of providing deflectors on front and rear lock-plates, and may also be less susceptible to stress concentrations and thermal fatigue cracking.

The centrifugal pull (effective weight) of the cooling plate and its support can be less than the effective weight of thickened lock-plates with deflectors.

Cooling improvements to the disc post can allow increases in overall engine pressure ratio as the elevated coolant temperature can be offset by the improved levels of heat transfer.

Conversely, the gas path temperature can be increased without causing a detrimental effect on the disc post life, or the need to increase cooling flow.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A cooling arrangement for a turbine disc of a gas turbine engine, the turbine disc having a plurality of circumferentially spaced disc posts forming fixtures therebetween for a row of turbine blades, each turbine blade having an attachment formation which engages at a respective fixture, a platform radially outwardly of the attachment formation such that the adjacent platforms of the row form an inner endwall for a working gas annulus of the engine, and an aerofoil which extends radially outwardly from the platform, wherein a respective cavity is formed between an exposed radially outer surface of each disc post and the inner endwall;

wherein the cooling arrangement comprises:

at each disc post, a cooling plate having one or more exit holes formed therein for transferring spent coolant from a cooling channel to the cavity, each cooling plate being removably locatable in the respective cavity and spaced radially outwardly from the exposed outer surface of the disc post and spaced radially inwardly from the platform so that the entirety of the cooling plate does not touch the platform and forms the cooling channel between the cooling plate and the exposed outer surface, each cooling plate covering substantially the entire exposed outer surface, and a coolant supply system for supplying coolant to the cooling channels, wherein the coolant supply system diverts a portion of a flow of coolant for internally cooling the aerofoils towards the cooling channels, the system comprising a plurality of passages extending across the front and/or the rear faces of the disc post from a base of the fixtures for the turbine blades to the forward and/or rearward ends of the cooling channels respectively.

2. A cooling arrangement according to claim 1, wherein the or each exit hole is positioned axially centrally in the cooling plate, and the coolant supply system supplies coolant to both the forward and the rearward ends of the cooling channel.

3. A cooling arrangement according to claim 1, wherein, at each disc post, support formations are formed in the flanks of the neighbouring turbine blades, the support formations supporting the cooling plate to maintain the radial spacing between the cooling plate and the exposed outer surface.

4. A cooling arrangement according to claim 1, wherein lock-plates are provided at the fore and aft faces of the disc posts to prevent axial movement of the blades relative to the disc, and, at each disc post, support formations are formed in the respective fore and aft lock-plates, the support formations supporting the cooling plate to maintain the radial spacing between the cooling plate and the exposed outer surface.

5. A cooling arrangement according to claim 1, wherein a separating member is positioned in the cooling channel between the cooling plate and the exposed outer surface, the separating member containing a plurality of holes and dividing the cooling channel into a radially outer channel and a radially inner channel, and the coolant supply system supplying the coolant to the outer channel, whereupon the supplied coolant enters the inner channel via the holes as a series of jets which impinge on the exposed outer surface.

6. The turbine blade configured with the cooling arrangement of claim 3.

7. A stage of the gas turbine engine comprising the turbine disc, the row of turbine blades attached to the turbine disc, and configured with the cooling arrangement for the turbine disc according to claim 1.

* * * * *